United States Patent
Chai et al.

(10) Patent No.: US 10,047,681 B2
(45) Date of Patent: Aug. 14, 2018

(54) METHOD FOR DETECTING AND CONTROLLING LOAD WEIGHT OF VEHICLE BY MEANS OF TIRE PRESSURE OF VEHICLE AND DEVICE THEREOF

(71) Applicant: Fang-Jun Chai, Taichung (TW)

(72) Inventors: Fu Chai, Taichung (TW); Fang-Jun Chai, Taichung (TW)

(73) Assignee: Fang-Jun Chai, Taichung (TW)

( * ) Notice: Subject to any disclaimer, the term of this patent is extended or adjusted under 35 U.S.C. 154(b) by 0 days.

(21) Appl. No.: 15/385,708

(22) Filed: Dec. 20, 2016

(65) Prior Publication Data

US 2017/0184034 A1 Jun. 29, 2017

(30) Foreign Application Priority Data

Dec. 28, 2015 (TW) ............................ 104144061 A

(51) Int. Cl.
```
F02D 9/02      (2006.01)
F02D 41/26     (2006.01)
B60L 3/12      (2006.01)
B60C 23/04     (2006.01)
F02D 41/02     (2006.01)
```

(52) U.S. Cl.
CPC .............. *F02D 9/02* (2013.01); *B60L 3/12* (2013.01); *F02D 41/26* (2013.01); *B60C 23/04* (2013.01); *B60L 2240/12* (2013.01); *B60L 2240/26* (2013.01); *F02D 41/021* (2013.01); *F02D 2250/26* (2013.01)

(58) Field of Classification Search
CPC .............................. B60L 2240/26; B60C 23/04
See application file for complete search history.

(56) References Cited

U.S. PATENT DOCUMENTS

| | | | | |
|---|---|---|---|---|
| 5,583,483 | A * | 12/1996 | Baumann | B60C 23/061 340/432 |
| 5,793,285 | A * | 8/1998 | Wehinger | B60C 23/067 116/34 R |
| 6,232,875 | B1 * | 5/2001 | DeZorzi | B60C 23/0408 116/34 R |
| 7,013,721 | B2 * | 3/2006 | Keller | B60C 23/061 73/146 |
| 8,942,949 | B2 * | 1/2015 | Hammerschmidt | B60C 23/0474 702/138 |

(Continued)

*Primary Examiner* — Hieu T Vo
*Assistant Examiner* — Arnold Castro
(74) *Attorney, Agent, or Firm* — Ming Chow; Sinorica, LLC

(57) ABSTRACT

A method for detecting and controlling a load weight of a vehicle by means of a tire pressure of the vehicle and a device are provided. The method includes the steps of installation setting, detecting the load weight, and controlling an electric switch. The device includes tire pressure detectors installed on rear wheels of the vehicle and connected with a processor which is input with a preset tire pressure value and able to receive the tire pressure detected by the tire pressure detectors. The processor is connected with an electric switch of the vehicle. The processor compares the tire pressure detected by the tire pressure detectors with the preset tire pressure value, and controls the electric switch to turn on/off a power source of the vehicle. The device is capable of detecting and controlling the load weight of the vehicle by detecting a change of the tire pressure.

8 Claims, 3 Drawing Sheets

(56) References Cited

U.S. PATENT DOCUMENTS

| | | | |
|---|---|---|---|
| 9,358,846 B2* | 6/2016 | Singh | G01G 19/086 |
| 2007/0038408 A1* | 2/2007 | Gaunt | B60C 23/001 |
| | | | 702/138 |
| 2007/0069877 A1* | 3/2007 | Fogelstrom | B60C 23/005 |
| | | | 340/442 |
| 2010/0171605 A1* | 7/2010 | Hain | B60C 23/0408 |
| | | | 340/447 |
| 2010/0180677 A1* | 7/2010 | Katou | B60C 23/04 |
| | | | 73/146.3 |
| 2013/0035834 A1* | 2/2013 | Couch | B60C 23/20 |
| | | | 701/70 |
| 2014/0005956 A1* | 1/2014 | Patel | B60C 23/04 |
| | | | 702/41 |
| 2014/0008132 A1* | 1/2014 | Kamamann | B60C 23/0408 |
| | | | 177/1 |
| 2014/0070936 A1* | 3/2014 | Schwab | B60C 23/0457 |
| | | | 340/447 |
| 2014/0232080 A1* | 8/2014 | Karel | B62D 61/12 |
| | | | 280/86.5 |
| 2015/0019165 A1* | 1/2015 | Theuss | G01G 19/12 |
| | | | 702/173 |
| 2015/0061852 A1* | 3/2015 | Fu | B60C 23/0474 |
| | | | 340/442 |
| 2016/0059643 A1* | 3/2016 | Infantini | B60C 23/002 |
| | | | 152/415 |
| 2016/0200155 A1* | 7/2016 | Steinmeyer | B60C 23/061 |
| | | | 73/146.2 |
| 2016/0202147 A1* | 7/2016 | Svantesson | G01M 17/02 |
| | | | 702/189 |
| 2016/0355189 A1* | 12/2016 | Lin | B60W 40/13 |
| 2017/0124784 A1* | 5/2017 | Wittmann | G07C 5/0808 |
| 2017/0182999 A1* | 6/2017 | Lai | B60W 30/02 |
| 2017/0197481 A1* | 7/2017 | Peine | B60C 23/0486 |
| 2017/0217261 A1* | 8/2017 | Mays | B60C 23/0479 |

* cited by examiner

METHOD FOR DETECTING AND CONTROLLING LOAD WEIGHT OF VEHICLE BY MEANS OF TIRE PRESSURE OF VEHICLE AND DEVICE THEREOF

FIELD OF THE INVENTION

The present invention relates to a method for controlling a load weight of a vehicle and a device thereof, and more particularly to a method for detecting and controlling a load weight of a vehicle by means of a tire pressure of the vehicle and a device thereof.

BACKGROUND OF THE INVENTION

Vehicles can be used as a tool to carry people and cargoes to bring great convenience. However, the engine of a general vehicle usually burns gas or diesel fuel as a power source. The exhaust gas of the engine not only causes air pollution but also harm the human health, and carbon dioxide in the exhaust gas will bring the greenhouse effect to intensify global warming.

In recent years, electric vehicles are gradually popular because the environmental awareness is enhanced and the electric vehicles don't have the problem of exhaust gas and have excellent energy efficiency. However, the loads of the electric motor and the battery of the electric vehicle increase with the increase of the load weight of the electric vehicle. When the load weight of the electric vehicle reaches a predetermined value, the battery of the electric vehicle is liable to be damaged by overload.

Accordingly, the inventor of the present invention has devoted himself based on his many years of practical experiences to solve these problems.

SUMMARY OF THE INVENTION

The primary object of the present invention is to provide a method for detecting and controlling a load weight of a vehicle by means of a tire pressure of the vehicle and a device thereof, which is capable of controlling the load weight of the vehicle by detecting a change of the tire pressure of the vehicle, thereby restricting a power source of the vehicle from starting to achieve the control of the load weight of the vehicle and to avoid any damage to the vehicle components.

According to an aspect of the present invention, a method for detecting and controlling a load weight of a vehicle by means of a tire pressure of the vehicle is provided. The method comprises the following steps of: installation setting, at least two tire pressure detectors being installed on rear wheels at left and right sides of the vehicle respectively, the tire pressure detectors being connected with a processor, the tire pressure detectors being turned on to detect the tire pressure of the vehicle not carrying a load, the processor recording the tire pressure for setting the tire pressure detector to make zero, the processor being input with a preset tire pressure value, the preset tire pressure value being greater than the tire pressure of the vehicle not carrying the load; detecting the load weight, the tire pressure detectors detecting the tire pressure of the vehicle to obtain a carrying tire pressure; and controlling an electric switch, the processor comparing the carrying tire pressure with the preset tire pressure value, wherein when the carrying tire pressure is greater than the preset tire pressure value, the processor controls the electric switch of the vehicle to be in a closed state to restrain a power source of the vehicle from starting, wherein when the carrying tire pressure is less than the preset tire pressure, the processor does not control the electric switch of the vehicle for the power source of the vehicle to be started freely.

According to another aspect of the present invention, a device for detecting and controlling a load weight of a vehicle by means of a tire pressure of the vehicle is provided. The device comprises at least two tire pressure detectors, a processor, and a control switch. The tire pressure detectors are installed on rear wheels at left and right sides of the vehicle respectively for detecting the tire pressure of the vehicle. The processor is connected with the tire pressure detectors to receive the tire pressure detected by the tire pressure detectors. The processor is input with a preset tire pressure value for comparing the tire pressure detected by the tire pressure detectors with the preset tire pressure value. The control switch is connected with the processor. The control switch is further connected with an electric switch of the vehicle.

Thereby, the processor compares the tire pressure detected by the tire pressure detectors with the preset tire pressure value. When the tire pressure detected by the tire pressure detectors is greater than the preset tire pressure value, the processor controls the electric switch of the vehicle to be in the closed state to restrain the power source of the vehicle from starting. When the tire pressure detected by the tire pressure detectors is less than the preset tire pressure, the processor does not control the electric switch of the vehicle for the power source of the vehicle to be started freely.

DETAILED DESCRIPTION OF THE PREFERRED EMBODIMENTS

Embodiments of the present invention will now be described, by way of example only, with reference to the accompanying drawings.

Figure 1:
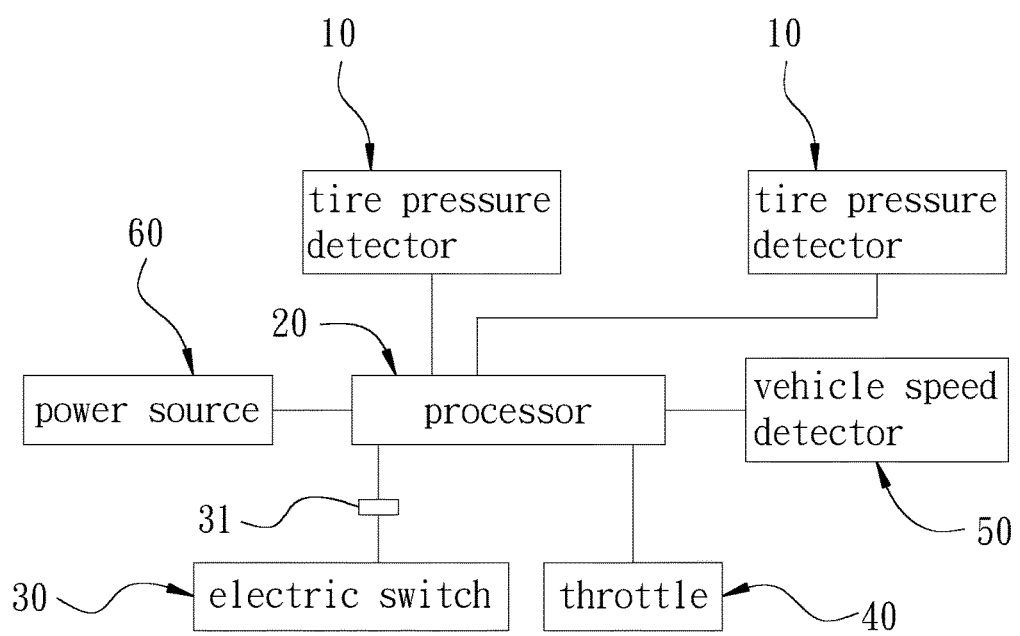
FIG. 1 is a block diagram of the device of the present invention.

FIG. 1 is a block diagram of the device of the present invention. The present invention discloses a device for detecting and controlling a load weight of a vehicle by means of a tire pressure of the vehicle. The device comprises two tire pressure detectors 10, a processor 20, and a control switch 31.

The two tire pressure detectors 10 are respectively installed on rear wheels at left and right sides of the vehicle for detecting the tire pressure of the vehicle. However, this is merely an exemplary embodiment. The present invention may be embodied in many different forms and should not be construed as being limited to this embodiment. When the device is installed to a multi-wheel vehicle such as a six-wheel or eight-wheel vehicle, a plurality of tire pressure detectors 10 may be installed on the rear wheels for detecting the tire pressure of the vehicle.

The processor 20 is connected with the tire pressure detectors 10 to receive the tire pressures detected by the tire pressure detectors 10 and may further calculate an average value of the tire pressures. The processor 20 is input with a preset tire pressure value for calculating and comparing the average value of the tire pressures with the preset tire pressure value.

The control switch 31 is connected with the processor 20, and the control switch 31 is further connected with an electric switch 30 of the vehicle. The electric switch 30 of the vehicle is further connected with a power source 60 of the vehicle via the control switch 31 and the processor 20. In the present invention, the control switch 31 is a relay. The relay is connected with the processor 20 for the processor 20 to control the relay to selectively form an open circuit or a closed circuit, so that the processor 20 can control the connection between the electric switch 30 and the power source 60 through the relay. The power source 60 is a motor of an electric vehicle. However, this is merely an exemplary embodiment. The present invention may be embodied in many different forms and should not be construed as being limited to this embodiment. The present invention may be applied to a general vehicle, and the power source 60 is the engine of the vehicle.

A throttle 40 of the vehicle is connected with the processor 20 so that the throttle 40 of the vehicle is connected to the power source 60 of the vehicle via the processor 20 for controlling the throttle 40 of the vehicle.

A vehicle speed detector 50 of the vehicle is connected with the processor 20 to receive the vehicle speed detected by the vehicle speed detector 50. In the present invention, the vehicle speed detector 50 is a speedometer, and the processor 20 is connected with the speedometer.

Figure 2:
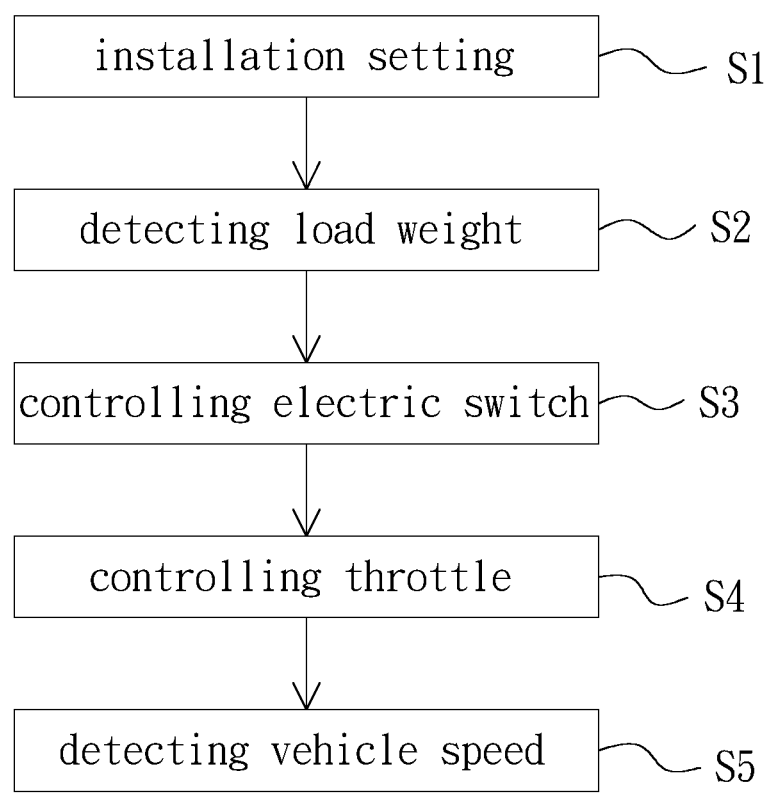
FIG. 2 is a block diagram of the steps of the present invention.
Figure 3:
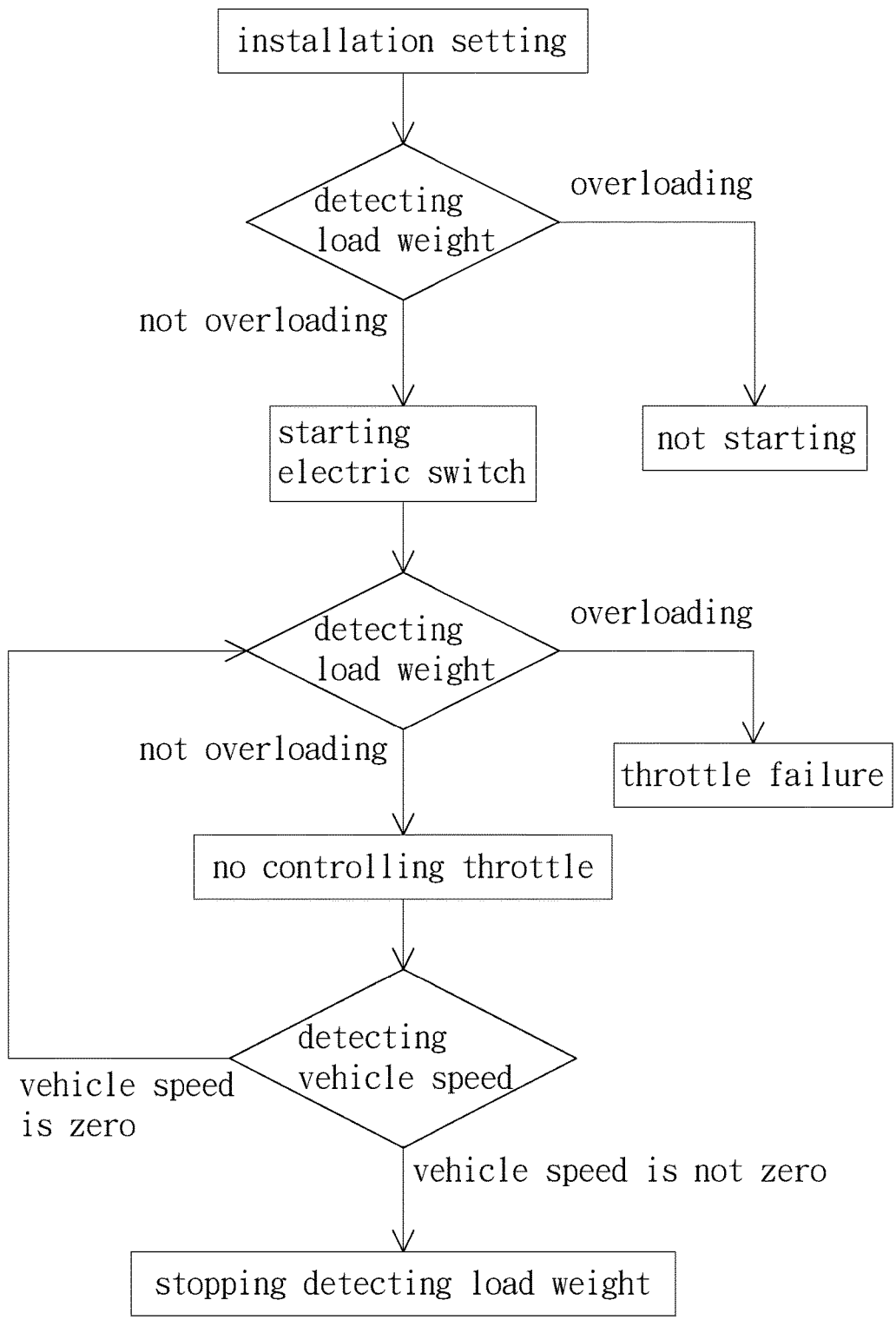
FIG. 3 is a flow chart of the present invention.

FIG. 2 is a block diagram of the method of the present invention. FIG. 3 is a flow chart of the present invention. The present invention discloses a method for detecting and controlling a load weight of a vehicle by means of a tire pressure of the vehicle. The method comprises the following steps:

installation setting S1: the tire pressure detectors 10 are installed on the rear wheels at the left and right sides of the vehicle respectively, and the tire pressure detectors 10 are connected with the processor 20, and the tire pressure detectors 10 are turned on to detect the tire pressure of the vehicle not carrying a load, and the processor 20 records the tire pressure for setting the tire pressure detector 10 to make zero, and the processor 20 is input with a preset tire pressure value. Wherein, the preset tire pressure value is greater than the tire pressure of the vehicle not carrying a load, and the preset tire pressure value corresponds to the tire pressure when the load weight of the vehicle reaches the upper limit of the load weight;

detecting the load weight S2: the tire pressure of the vehicle is detected by the tire pressure detectors 10, and the average value of the tire pressures is calculated to obtain a carrying tire pressure;

controlling the electric switch S3: the processor 20 compares the carrying tire pressure with the preset tire pressure value, and when the carrying tire pressure is greater than the preset tire pressure value, the processor 20 makes the control switch 31 form an open circuit so that the electric switch 30 of the vehicle is not connected with the power source 60 for controlling the electric switch 30 of the vehicle to be in a closed state to restrain the power source 60 of the vehicle from starting, and when the carrying tire pressure is less than the preset tire pressure, the processor 20 makes the control switch 31 form a closed circuit so that the electric switch 30 of the vehicle is connected with the power source 60 to start the power source, and the processor 20 does not control the electric switch 30 of the vehicle for the power source 60 of the vehicle to be started freely;

controlling the throttle S4: after the power source 60 of the vehicle is started, the processor 20 continuously compares the carrying tire pressure with the preset tire pressure value to avoid a change of the load weight of the vehicle, when the carrying tire pressure is greater than the preset tire pressure value, the processor 20 controls the throttle 40 of the vehicle to be in the closed state to restrain an power output of the vehicle, and when the carrying tire pressure is less than the preset tire pressure value, the processor 20 does not control the throttle 40 of the vehicle, allowing the vehicle to be driven freely.

detecting the vehicle speed S5: the processor 20 is connected with the vehicle speed detector 50 for the processor 20 to monitor the driving speed of the vehicle, when the processor 20 monitors that the driving speed of the vehicle is not zero and is in a running state, the processor 20 terminates the control of the electric switch and the throttle for the vehicle to be driven freely. At this time, the tire pressure detectors 10 continuously detect the tire pressure of the vehicle.

Since the tire pressure of the vehicle is proportional to the load weight of the vehicle, the processor 20 compares the tire pressure detected by the tire pressure detectors 10 with the preset tire pressure value so that the load weight of the vehicle is calculated. When the tire pressure detected by the tire pressure detectors 10 is greater than the preset tire pressure value, the load weight of the vehicle exceeds the upper limit of the load weight. At this time, the processor 20 controls the electric switch 30 of the vehicle to be in the closed state to restrain the power source 60 of the vehicle from starting. If the tire pressure detected by the tire pressure detectors 10 is less than the preset tire pressure value, namely, the load weight of the vehicle does not reach the upper limit of the load weight, the processor 20 does not control the electric switch 30 of the vehicle for the power source 60 of the vehicle to be started freely.

If the load weight is changed when the power source 60 of the vehicle is started, the processor 20 continuously compares the tire pressure detected by the tire pressure detectors 10 with the preset tire pressure value to calculate the load weight. When the tire pressure detected by the tire pressure detectors 10 is greater than the preset tire pressure value, namely, the load weight of the vehicle exceeds the upper limit of the load weight, the processor 20 controls the throttle 40 of the vehicle to be in the closed state to restrain the power output of the vehicle. When the tire pressure detected by the tire pressure detectors 10 is less than the preset tire pressure value, namely, the load weight of the vehicle doesn't reach the upper limit of the load weight, the processor 20 does not control the throttle 40 of the vehicle, allowing the vehicle to be driven freely.

When the vehicle starts driving, the vehicle speed detector 50 immediately monitors the driving speed of the vehicle, and the driving speed is transmitted to processor 20. When the processor 20 monitors that the driving speed of the vehicle is not zero, it immediately terminates the control of the electric switch and the throttle, allowing the vehicle to be driven freely. This avoids a change of the tire pressure during driving to cause the processor 20 to erroneously determine a change of the load weight.

After the vehicle closes the electric switch 30 and stops driving, the step is returned to Step S2 detecting the load weight. When the load weight of the vehicle does not reach the upper limit of the load weight, the electric switch 30 is restarted.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A load weight detection and control method comprising:
providing an electric vehicle, the electric vehicle comprising two rear wheels at left and right sides thereof, a power source, an electric switch, the two rear wheels forming a tire pressure, the power source being an electric motor;
electrically connecting the power source with the electric switch;
providing two tire pressure detectors;
installing the two tire pressure detectors on the two rear wheels respectively;
providing a processor;
electrically connecting the tire pressure detectors with the processor;
detecting the tire pressure by the two tire pressure detectors;
receiving the tire pressure by the processor;
inputting a preset tire pressure value into the processor;
comparing the tire pressure with the preset tire pressure value by the processor;
providing a control switch;
electrically connecting the control switch with the processor and the electric switch;
initiating controlling, by the processor, the electric switch to be in a closed state so as to restrain the power source from activating in response to the tire pressure being greater than the preset tire pressure value; and
terminating controlling, by the processor, the electric switch to be in the not controlled state by the processor so as not to restrain the power source from activating in response to the tire pressure being less than the preset tire pressure.

2. The method as claimed in claim 1 comprising:
rendering the electric vehicle comprising a throttle and a power output;
electrically connecting the power output with the throttle;
electrically connecting the throttle with the processor;
initiating controlling, by the processor, the throttle to be in a closed state so as to restrain the power output from activating in response to the tire pressure being greater than the preset tire pressure value; and
terminating controlling, by the processor, the throttle to be in the not controlled state by the processor so as not to restrain the power output from activating in response to the tire pressure being less than the preset tire pressure value.

3. The method as claimed in claim 2 comprising:
providing a vehicle speed detector;
electrically connecting the vehicle speed detector with the processor;
detecting a vehicle speed of the electric vehicle by the vehicle speed detector;
monitoring the vehicle speed of the electric vehicle by the processor; and
terminating controlling, by the processor, the electric switch and the throttle to be in the not controlled state by the processor so as not to restrain the power source and the power output from activating in response to the vehicle speed being not zero.

4. A load weight detection and control device comprising:
two tire pressure detectors;
the two tire pressure detectors being configured to be installed on two rear wheels at left and right sides of an electric vehicle respectively;
the two tire pressure detectors being configured to detect a tire pressure of the electric vehicle;
a processor;
the processor being electrically connected with the two tire pressure detectors;
the processor being configured to receive the tire pressure detected by the two tire pressure detectors;
the processor being input with a preset tire pressure value for comparing;
the preset tire pressure value being configured to be compared with the tire pressure detected by the two tire pressure detectors;
a control switch;
the control switch being electrically connected with the processor;
the control switch being configured to be electrically connected with an electric switch of the electric vehicle;
the processor being configured to compare the tire pressure detected by the tire pressure detectors with the preset tire pressure value;
the processor being configured to initiate controlling the electric switch of the electric vehicle to be in a closed state so as to restrain a power source of the electric vehicle from activating in response to the tire pressure detected by the tire pressure detectors being greater than the preset tire pressure value, the power source being an electric motor; and
the processor being configured to terminate controlling the electric switch of the electric vehicle to be in the not controlled state by the processor so as not to restrain the power source of the electric vehicle from activating in response to the tire pressure detected by the tire pressure detectors being less than the preset tire pressure.

5. The load weight detection and control device as claimed in claim 4, wherein the control switch is a relay, the relay is electrically connected with the processor, and the processor is configured to control the electric switch through the relay.

6. The load weight detection and control device as claimed in claim 4, wherein the processor is configured to be electrically connected with a throttle of the electric vehicle, and the processor is configured to control the throttle of the electric vehicle.

7. The load weight detection and control device as claimed in claim 4 comprising:
a vehicle speed detector; and
the vehicle speed detector being electrically connected with the processor.

8. A load weight detection and control system comprising:
an electric vehicle;
a processor;
two tire pressure detectors;
a control switch;
a vehicle speed detector;
the electric vehicle comprising two rear wheels at left and right sides thereof, a power source, an electric switch, a power output and a throttle;
the two rear wheels forming a tire pressure;
the power source being an electric motor;
the power source being electrically connected with the electric switch;

the power output being electrically connected with the throttle;

the control switch being electrically connected with the electric switch;

the two tire pressure detectors, the control switch, the vehicle speed detector and the throttle being electrically connected with the processor;

the two tire pressure detectors being installed on the two rear wheels respectively;

the two tire pressure detectors detecting the tire pressure;

the processor receiving the tire pressure detected by the two tire pressure detectors;

the processor being input with a preset tire pressure value;

the preset tire pressure value being compared with the tire pressure detected by the two tire pressure detectors;

the processor comparing the tire pressure detected by the tire pressure detectors with the preset tire pressure value;

the processor initiating controlling the electric switch to be in a closed state so as to restrain the power source from activating in response to the tire pressure detected by the tire pressure detectors being greater than the preset tire pressure value;

the processor terminating controlling the electric switch to be in the not controlled state by the processor so as not to restrain the power source from activating in response to the tire pressure detected by the tire pressure detectors being less than the preset tire pressure;

the processor initiating controlling the throttle to be in a closed state so as to restrain the power output from activating in response to the tire pressure detected by the tire pressure detectors being greater than the preset tire pressure value;

the processor terminating controlling the throttle to be in the not controlled state by the processor so as not to restrain the power output from activating in response to the tire pressure detected by the tire pressure detectors being less than the preset tire pressure;

the vehicle speed detector detecting a vehicle speed of the electric vehicle;

the processor monitoring the vehicle speed; and the processor terminating controlling the electric switch and the throttle to be in the not controlled state by the processor so as not to restrain the power source and the power output from activating in response to the vehicle speed being not zero.

\* \* \* \* \*